US007020087B2

(12) United States Patent
Steinberg et al.

(10) Patent No.: US 7,020,087 B2
(45) Date of Patent: Mar. 28, 2006

(54) SEGMENTED AND DISTRIBUTED PATH OPTIMIZATION IN A COMMUNICATION NETWORK

(75) Inventors: Paul D. Steinberg, Bartlett, IL (US); Richard J. Malcolm, Carol Stream, IL (US); Joseph M. Pedziwiatr, La Grange, IL (US); Richard E. White, Cary, IL (US); Daniel F. Tell, Lake Forest, IL (US); Brian J. Moore, Palatine, IL (US); Stephen L. Spear, Skokie, IL (US); John M. Sauer, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 289 days.

(21) Appl. No.: 10/341,141

(22) Filed: Jan. 13, 2003

(65) Prior Publication Data

US 2004/0136324 A1    Jul. 15, 2004

(51) Int. Cl.
*H04L 12/26* (2006.01)
(52) U.S. Cl. ...................... 370/238; 370/235; 370/401; 370/352
(58) Field of Classification Search ................ 370/351, 370/352–356, 229–238, 360, 389, 392, 396; 379/221.01; 709/239
See application file for complete search history.

(56) References Cited

U.S. PATENT DOCUMENTS

| | | | | |
|---|---|---|---|---|
| 5,933,425 A | * | 8/1999 | Iwata | ........................ 370/351 |
| 5,953,319 A | * | 9/1999 | Dutta et al. | .................. 370/238 |
| 6,144,641 A | * | 11/2000 | Kaplan et al. | ............... 370/238 |
| 6,374,112 B1 | * | 4/2002 | Widegren et al. | ......... 455/452.2 |
| 6,377,551 B1 | * | 4/2002 | Luo et al. | .................... 370/238 |
| 6,512,745 B1 | * | 1/2003 | Abe et al. | .................... 370/232 |
| 6,701,149 B1 | * | 3/2004 | Sen et al. | .................... 455/436 |
| 6,950,398 B1 | * | 9/2005 | Guo et al. | .................. 370/235 |
| 2003/0147400 A1 | * | 8/2003 | Devi | ...................... 370/395.21 |
| 2004/0067754 A1 | * | 4/2004 | Gao et al. | .................. 455/442 |

* cited by examiner

*Primary Examiner*—Dang Ton
*Assistant Examiner*—Michael J Moore
(74) *Attorney, Agent, or Firm*—Lalita W. Pace

(57) ABSTRACT

The invention provides for path optimization for routing of a communication session in a network having a plurality of core networks coupled to a plurality of access networks. Both a core network and an access network perform the path optimization by determining a plurality of possible paths to a plurality of target access points to form a target matrix, determining a corresponding route preference factor for each possible path of the target matrix, and selecting, from the target matrix, a possible path having an optimal route preference factor. An overall or complete path, for routing of the communication session, is then determined either by combining the selected possible paths, or by selecting one possible path as a complete path. The route preference factor, for each possible path, is determined based upon various routing variables, such as quality of service, bandwidth for the communication session, route complexity, interconnect cost, routing cost; resource loading, resource availability, and operator preference for traffic biasing.

16 Claims, 4 Drawing Sheets

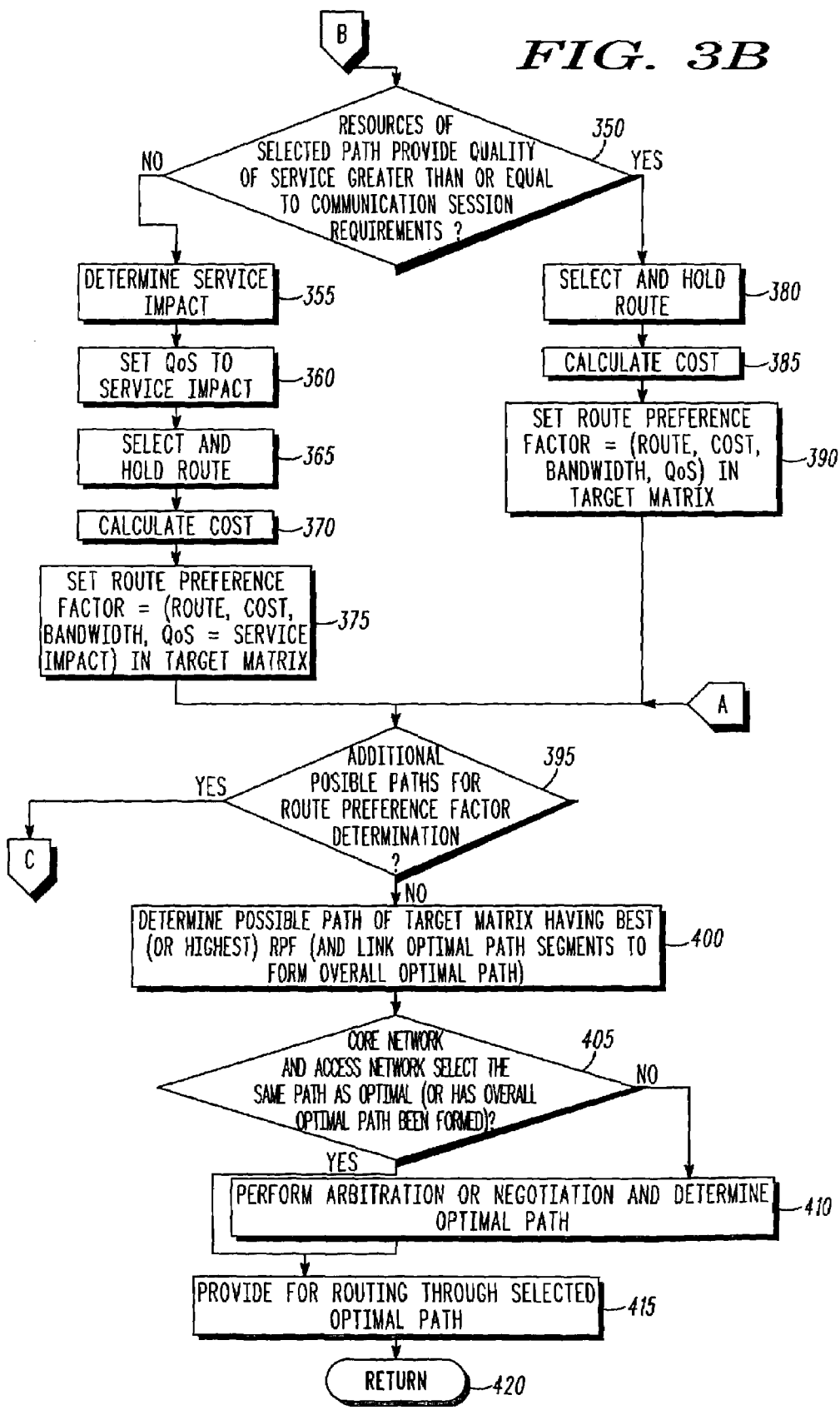

SEGMENTED AND DISTRIBUTED PATH OPTIMIZATION IN A COMMUNICATION NETWORK

FIELD OF THE INVENTION

The present invention is related, in general, to communication networks and systems, and more particularly, to systems and methods for optimizing routing of or path selection for communication sessions in mobile or wireless communication networks.

BACKGROUND OF THE INVENTION

In a wireless or mobile communication system, including multiple access systems such as code division multiple access ("CDMA"), CDMA 2000, wideband CDMA ("WCDMA"), time-division multiple access ("TDMA") systems such as GSM (global system mobile), other cellular or PCS communication systems, wireless local area networks ("WLAN"), mobile IP (internet protocol) systems, and other wireless networks, interconnection facilities contribute a significant portion of the fixed costs of an operator or other service provider. Such interconnection facilities are used both to establish and to handoff or transfer communication sessions, as mobile units (subscribers) move about within geographic coverage regions, between and among core network facilities and access networks. A core network, as that terminology is used herein, is to be construed broadly to mean and include any and all network facilities having switching, routing, or other intelligent functions. A core network may typically include, for example, one or more facilities or devices such as wireline switches, mobile switching centers ("MSCs"), softswitches (circuitless switching exchanges), call agents (voice over packet call control entities), application servers of IP networks, packet routers, home agents and foreign agents for mobile IP, visitor location registers ("VLRs"), intelligent nodes such as service control points ("SCPs"), a service circuit nodes ("SCNs") (or service nodes), an intelligent peripheral ("IP"), packet data serving nodes ("PDSN") (e.g., in CDMA2000), GSM switching centers or nodes, generalized packet radio service ("GPRS") nodes (global GPRS support nodes ("GGSNs") and serving GPRS support nodes ("SGSNs"), and similar devices. An access network ("AN"), as used herein, is also to be interpreted broadly, to mean and include devices which provide a direct information link to one or more mobile units or mobile stations, such as for the transmission and reception of communication sessions with mobile units, such as for voice, data, multimedia, or any other information. For example, an access network may include one or more facilities or devices such as base station controllers ("BSCs"), base transceiver stations ("BTSs") (or equivalent transceivers and controllers), along with other access equipment used to communicate wirelessly in any system, such as base stations supporting WLAN air interfaces (in wireless LAN systems), wireless LAN access points, and any other devices which send and receive data to and from mobile units. The information transmitted or received may be of any type or kind, under any applicable protocol, including analog, digital, spread spectrum, and so on. The mobile units (or mobile stations) may be of any type or kind, such as cellular, CDMA or 3G communication devices, mobile computers, personal digital assistants, and so on.

Typically, to facilitate such session establishment or handoff, core network interconnect (often referred to as backhaul transport facilities) are used to provide connections among the core network facilities, and access network (AN) interconnect (often referred to as side-haul transport facilities) are used to provide connections among the access networks.

As mobile units traverse a geographic region, or during a re-routing of sessions (including packet sessions), the point of access to the communication network (for the other, remote end or portion of the communication session) typically remains constant, requiring voice and data traffic to be transported between and among the various core network (and access network) facilities for continuation of the communication session. For example, for a session to or from the public switched telephone network ("PSTN"), a mobile switching center providing such fixed access to the PSTN for a given session is typically referred to as an anchor (or originating) MSC (or GGSN), while the MSC providing service to the roaming mobile unit is typically referred to as a serving MSC (or SGSN). As mobile units traverse geographic regions within the coverage of a single switch or node, handoffs typically occur between the coverage areas of the access networks, such as base station transceivers, including soft handoffs of CDMA systems.

As indicated above, these transport facilities typically entail significant fixed costs, which vary depending upon the nature of the facilities, tariffing, whether they are public, leased, or operator owned, and so on, and it is important for the operator to utilize these facilities most efficiently and at a lowest cost, while nonetheless providing desired or requested levels of service. As a consequence, path optimization is utilized to determine an efficient or a most efficient path through the core network, the interconnect, and the access networks, to establish and maintain the communication session through one or more handoffs or other re-routing.

In the prior art, such path optimization is performed solely by the core network, such as the MSCs, wireline switches, or the network routers. In circuit-switched networks, factors utilized in path optimization (trunk or route selection) typically include time of day considerations, holidays, and tariff cost minimization. In packet and internet protocol (IP) routing, routers typically utilize a least cost routing algorithm, such as OSPF (Open Shortest Path First).

In GSM systems, path optimization is performed in a hierarchical manner, with base station equipment performing path choices for transceivers within its control, with all other path choices performed at the higher switch or node level.

None of these methods of path optimization provide truly optimal routing choices, under potentially changing circumstances, and given potentially changing requirements for any given communication session. As a consequence, a need exists for a method and system to provide network path (or routing) optimization, which accounts for these changing circumstances, and which affords distributed control over path decisions.

SUMMARY OF THE INVENTION

The invention provides for path optimization for routing of a communication session in a network having a plurality of core networks coupled to a plurality of access networks. Both a core network and an access network (AN) perform the path optimization, independently and from their own perspectives, by determining a plurality of possible paths to a plurality of targets or end points, such as target transceivers, to form a target matrix; determining a corresponding route preference factor for each possible path of the target matrix; and selecting, from the target matrix, a possible path having an optimal route preference factor.

In one embodiment, the core network and the access network each include, in their route preference factor calculations, only a corresponding portion of a complete path which is either under its control or within its knowledge base, i.e., one or more path segments which, when combined, would form a complete end-to-end path. Path optimization of the present invention may then determine an overall or complete optimal path, based upon combining the separate path segments from each target matrix having the most optimal, individual route preference factor.

In another embodiment, the possible paths under consideration are each a complete (end-to-end) path. When both the core network and the access network have selected the same possible path as optimal, this optimal path is selected for routing of the communication session. When the same possible path initially has not been selected as optimal, other procedures may be used to determine a selected path for routing of the communication session, including selecting the path having the best or most optimal combined preferences, as determined by the route preference factors of the target matrices of both the core network and the access network, or selecting a path based upon an arbitration, negotiation, or other conflict resolution procedure.

The route preference factor, for each possible path, is determined based upon various routing variables, such as quality of service, bandwidth for the communication session, route complexity, interconnect cost, routing cost; resource loading, resource availability, and operator preference for traffic biasing. The variables are assigned numeric values, based upon current network conditions. An overall, comparative route preference factor is then formed, for example, as a weighted sum.

The present invention provides distributed and segmented network path optimization, at both a core network level and an access network (AN) level, to provide the most efficient use of network resources, under both current and potentially changing circumstances and communication session requirements. The present invention allows the access network and core network to collaborate to select the most cost efficient and highest quality paths between and among their respective resources, and further allows the access network to make local optimization decisions autonomously and to independently optimize around the core network.

Numerous other advantages and features of the present invention will become readily apparent from the following detailed description of the invention and the embodiments thereof, from the claims and from the accompanying drawings.

BRIEF DESCRIPTION OF THE DRAWINGS

The foregoing and other objects, features and advantages of the present invention will be more readily appreciated upon reference to the following disclosure when considered in conjunction with the accompanying drawings, in which:

FIGS. 3A and 3B are flow diagrams illustrating an exemplary method embodiment for segmented and distributed path optimization in accordance with the present invention.

DETAILED DESCRIPTION OF THE INVENTION

Figure 1:
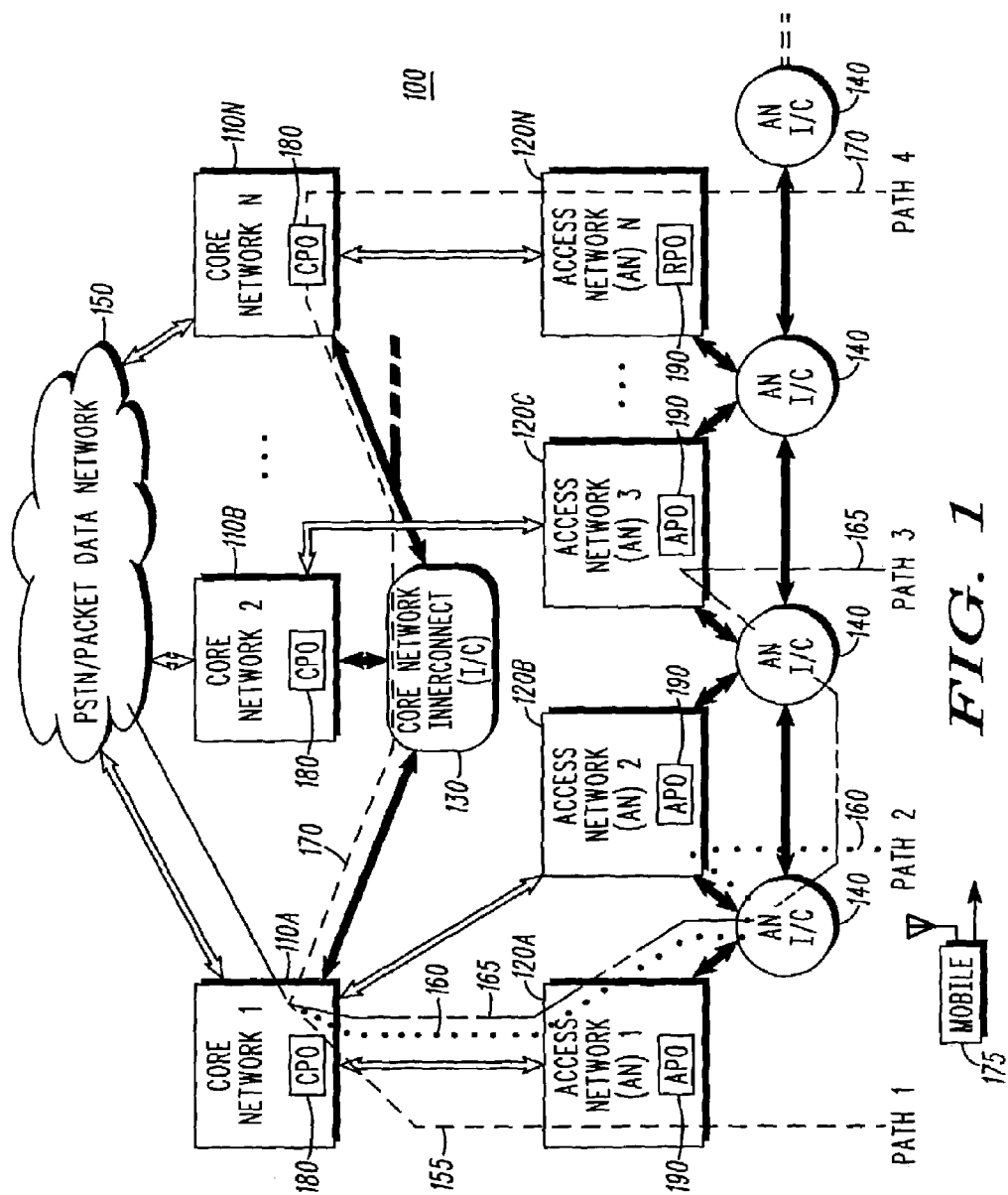
FIG. 1 is a block diagram illustrating various paths in system embodiments for segmented and distributed path optimization in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need exists for a method and system to provide network path (or routing) optimization. The present invention provides distributed and segmented network path optimization at both a core network level and an access network (AN) level, to provide the most efficient use of network resources, under both current and potentially changing circumstances, and given the current or changing requirements of any given communication session. Using factors or variables such as quality of service, requisite bandwidth, resource loading and availability, operator (or system) preferences, and route complexity, network path decisions are made by both the core network and the radio access network, with conflict resolution (if needed). The present invention allows the access network and core network to collaborate to select the most cost efficient and highest quality paths between and among their respective resources, and further allows the access network to make local optimization decisions autonomously and to independently optimize around the core network.

FIG. 1 is a block diagram illustrating various exemplary paths in system embodiments for segmented and distributed path optimization in accordance with the present invention. As illustrated in FIG. 1, core network 1 (110A), core network 2 (110B) and core network N (110N) (individually and collectively referred to herein as a core network 110) are coupled to each other through core network interconnect (I/C) 130, such as trunking, signaling, or other communication lines, for routing of communication sessions, for messaging, and for other packet transfer or signaling. As previously indicated, the "core network" is to be construed broadly to mean and include any and all network equipment which may provide switching, routing, or other intelligent functions, such as the exemplary facilities and devices mentioned above. Each of the core networks 110 include such switching and/or routing functionality, such as including one or more MSCs, GGSNs or SGSNs, switches, softswitches, call agents, home agents, PDSNs, routers, or other core network facilities discussed above, for routing of communication sessions to and from a broader network such as the public switched telephone network ("PSTN") and/or packet data network 150 (which may include IP, ATM, and other data networks). (Depending upon the circumstances, the various switches and routers within the broader network 150, and even the network 150, also may be considered to be core networks 110.) Each of the core networks 110 also include a function or process, as discussed in greater detail below, referred to as a core path optimization ("CPO") function 180, which performs a path optimization function or process from the perspective of a core network 110, as discussed below.

Access network (AN) 1 (120A), access network (AN) 2 (120B), access network (AN) 3 (120C), and access network (AN) N (120N) (individually and collectively referred to herein as an access network (AN) 120), are coupled to each other through access network (AN) interconnect (I/C) 140, such as trunking, signaling, or other communication lines. As previously indicated, "access network" (120) is to be construed broadly to mean and include any and all access equipment which may provide a direct information link to one or more mobile units or mobile stations, such as for the transmission and reception of communication sessions with mobile units, or a direct information link to a non-mobile device, such as a wireline device, including for communication of voice, data, multimedia, or any other information. For example, an access network may generally include a base transceiver station ("BTS") and/or a base station controller ("BSC"), or equivalent transceivers and controllers for various forms of wireless communication, such as wireless LAN access points, to provide wireless (or direct) communication with a mobile unit (e.g., mobile unit 175) over a designated band of the electromagnetic spectrum, such as CDMA communication with a CDMA mobile telephone of a subscriber, or GSM communication with a GSM-capable handheld device, for example. In a non-mobile application, an access network may include a controller or processor for one or more line cards of some kind, such as a PSTN, DSL or a cable line card, or for any other device for providing and receiving a signal on a communication medium. Each of the access networks 120 also includes switching and/or routing functionality, for example, to establish or facilitate a handoff of a mobile communication session. Each core network 110 is also coupled to one or more access networks 120, for routing (establishment or handoffs) of communication sessions, for message transmission and reception (such as messaging for handoffs, routing preferences, and routing decisions), and for other signaling. Each of the access networks 120 also include a function or process, referred to as an access network path optimization ("APO") function 190, which performs a path optimization function or process from the perspective of an access network 120, as discussed below. As illustrated, one or more of the core networks 110 and one or more of the access networks 120 comprise a system 100 of the present invention.

As an example in a mobile IP network, which uses routers referred to as a home agent and a foreign agent, traffic for a given IP host (mobile unit) is routed to a corresponding home agent for the mobile unit. The home agent acts as an anchor point for IP traffic to the given ghost (mobile unit). A traveling IP host may register with a foreign agent, such that data packets to (and from) the IP host are transferred, via the foreign agent, from (and to) the home agent. Under these circumstances, the home agent and the foreign agent would constitute a core network 110, with path selection between them involving the CPO process of the present invention. The routing involved between the foreign agent and the wireless transceiver (for transferring data packets to and from a mobile unit) would, as an access network 120, utilize the APO process of the present invention.

It should also be noted that core network 110 facilities and access network 120 facilities may be of different types and generations, and may be intermixed. For example, a core network facility may be a legacy-based circuit architecture, while one of its connected access networks is a next generation voice over packet multimedia architecture. Conversely, a core network device may be a mobile IP router, while one of its connected access networks is a legacy cellular or GSM base transceiver station.

Continuing to refer to FIG. 1, four various communication paths are illustrated which are exemplary of routing choices, for an initially established communication session (path 1 (155)) and for subsequent, successive handoffs of this communication session (path 2 (160), path 3 (165), and path 4 (170)), in accordance with the present invention. As illustrated, a communication path 1 (155) has been established, providing a communication session between a remote party (via PSTN/packet data network 150) and a mobile unit 175 in the geographic coverage region of access network 1 (120A), with the mobile unit 175 illustrated as traveling toward access network N (120N). The mobile unit 175 may be any type or kind of wireless communication device, such as a mobile telephone (CDMA, GSM, 3G, cellular, etc.), personal digital assistant, notebook computer, or any other mobile wireless device. Also as illustrated in FIG. 1, core network 1 (110A) is acting as an "anchor", such as an anchor MSC, from the initial establishment of the communication session through the PSTN/packet data network 150 and to maintain the communication session throughout the various handoffs illustrated.

In accordance with an exemplary embodiment of the present invention, a core network 110 and an access network 120 which will be or are currently handling a communication session, such as core network 1 (110A) and access network 1 (120A) for the illustrated communication path 1, will both perform a path optimization function. This path optimization process may be performed by both core network 1 (110A) and access network 1 (120A) for the initial routing and establishment of communication path 1, and again later to determine the routing for a subsequent handoff of the communication session of path 1. In other implementations, initial routing of the communication session of path 1 may be performed using other methods, with the path optimization processes of the invention performed only for the subsequent handoffs of the communication session. In addition to concerns of signal strength as a mobile unit traverses a geographic region, handoffs may also occur if characteristics of the communication session change, such as a request to increase bandwidth or to change quality of service. In addition to initial routing and handoffs, which may be the most common, these functions may also be invoked or triggered for other reasons, such as recovery from failure of a route or maintenance (when resources are removed from operation).

In other exemplary embodiments, as discussed in greater detail below, each network element having a path optimization functionality may perform this function, for path segments or path portions (paths through ingress and egress points) within its domain (such as for the facilities, regions and equipment under its control), and may also broadcast its results to other network elements. Those network elements involved in the ultimate, overall path decision process may utilize this broadcast information in determining the optimal, complete (or overall) path through the system 100. As a consequence, as used herein, for path optimization functions, "path" may refer to either or both a path segment (i.e., a portion of a larger, overall path) or to a larger, overall or complete path (for the end-to-end communication session).

The core network 110 will perform a core path optimization ("CPO") function 180, namely, will perform the path optimization function from its perspective as a core network 110, based upon its resources or resources under its control (i.e., its segments), such as other core networks 110, the core network interconnect 130, and one or more access networks 120. The access network 120 will perform an access network path optimization ("APO") function 190, i.e., will perform the path optimization function from its perspective as an access network 120, based upon its resources or resources under its control (i.e., its segments), such as the access network interconnect 140 and one or more other access networks 120. This performance of the path optimization by the core network 110 and the access network 120, each based upon their respective resources, creates the segmented path optimization of the present invention. The core network 110 and the access network 120 will each independently select an optimal path, or segment (or portion) of an overall optimal path, for initial establishment or for handoff of the communication session, based upon evaluation of a plurality of potential paths, for a distributed path determination of the present invention.

This plurality of potential paths, for session establishment or handoff of the communication session with the mobile unit 175, is referred to herein as a target matrix (or, equivalently, a path matrix), with the potential targets, referred to herein as "target access points" or simply "targets", being one or more of the communication devices which provide a direct link with or other system 100 access to a mobile unit (such as wireless transceivers (e.g., BTSs) and WLAN access points), and with the potential paths (via combinations of ingress and egress points) to the potential targets comprising the plurality of potential paths. Stated equivalently, the plurality of potential paths (forming the target (or path) matrix of a corresponding network element) may comprise each path connecting each permutation of ingress and egress points within the domain of the network element involved, such as within the respective domains of core network 110A and access network 120A. This second approach, of permutations of ingress and egress points, is particularly suited to the segmented approach discussed below.

It should also be noted that in the event that the core network 110 and the access network 120 select different optimal paths, or path segments which cannot be combined to form a complete (or overall) optimal path, other procedures will be utilized to determine an optimal path, including selecting the path having the best or most optimal combined preferences, as determined by the route preference factors of the target matrices of both the core network and the access network, or selecting a path based upon an arbitration, negotiation, or other conflict resolution procedure. Using these procedures, an (overall) optimal path is selected as the actual routing choice for implementation of the communication session or handoff of the communication session.

The system 100, for purposes of the present invention, may be viewed as merely having a first network portion, referred to as the core network 110, and a second network portion, referred to as the access network 120, each having separate network functions generally, such as routing and switching versus routing and wireless transmission and reception of communication sessions, and each of which perform a path optimization function from their corresponding perspectives. Other network divisions into a core network 110 (a first network portion) and an access network 120 (a second network portion) may also be made, including or covering different equipment or network entities, and are equivalent to the divisions used herein. For example, rather than having the CPO function reside in a switch, equivalently, such CPO functionality could reside in an intelligent network entity, such as a SCN, SCP or IN, or having APO functionality reside in equipment other than a BTS, BSC, or other access point. For purposes of the present invention, in referring to the core network 110 and the access network 120, it should be understood that reference is being made more generally to a first network portion and a second network portion, respectively, regardless of how an overall network or system 100 may be divided into these portions, but which correspondingly perform the CPO and APO functions for the distributed and segmented path optimization of the present invention.

In making this optimal path determination, the core network 110 and the access network 120 will each seek to maximize path (or interconnect) efficiency using variables or factors, referred to herein as routing variables or routing factors, including as examples and without limitation routing variables such as: (1) as session requirements, (a) quality of service ("QoS") (or renegotiated QoS) for the end to end path (considering introduced delays or speed of operation from different legs (or hops) through network equipment, and potential technology interconversions such as circuit/packet interworking), and (b) requisite bandwidth for the communication session (such as a video conference or a voice conference)(which also may be part of QoS; (2) cost, including interconnect cost, involving various hops summed across the path, potential costs of other operators or service providers, and other cost factors (such as costs in providing varying amounts of bandwidth for different types of sessions); (3) resource loading and availability; (4) operator (or system) preference to bias traffic to certain networks or technologies (robustness); and (5) route complexity, considering the number of hops (legs), the number of network elements involved, and the number of domains (or service provider boundaries) crossed. Those of skill in the art will recognize that other or additional variables may also be utilized and which are within the scope of the present invention. For example, security features for certain types of communication sessions may be an additional variable, with encrypted or physically secured routes, and with associated costs and bandwidth considerations, as well. For content delivery applications, the presence and amount of cached information in various parts of the system 100 may also be significant in assessing routing, such that the volume or amount of data to be moved through various paths may be an additional variable, particularly for IP, web and intranet applications. User preferences may also be a variable, particularly with regard to types of services, security, cost, and so on. In addition, several separate factors may comprise the routing variables mentioned above. For example, route complexity may involve factors such as distance, the number of legs (or "hops") required of a path, the potential delay involved, and potential instability of the handoff. Many of these variables, as input considerations into path optimization, involve dynamic information and changing network conditions, which should be updated, accrued and/or exchanged as conditions may change.

For each potential path within the target matrix, using one or more combinations of routing variables or inputs such as those described, the core network 110 and the access network 120 will each determine an overall, comparative result (or factor), which may then be used to directly compare the resulting efficiencies of routing over each such potential path of the target matrix. Referring herein to the overall, comparative result as a route preference factor ("RPF"), such an RPF may be created, for example, by forming a weighted sum of each variable utilized. Other methods of combining or permuting these factors or variables to form an overall preference factor may also be utilized, such as using a simple sum, a simple product, a weighted product, using integral or differential operations on the variables, or providing that one factor or variable may outweigh all others, such as nonavailability or diminished availability of a particular network resource, or insufficient bandwidth availability for the purpose of the communication session, and so on, resulting in an overall, comparative preference for each potential path within the target matrix.

In another variation, as various network entities or nodes (pluralities of core networks 110 and the access networks 120) select path segments, each entity may determine a route preference factor for its selected path segment(s), and dynamically exchange this information with the other network entities. For example, a given node may determine an RPF and forward it to another node, which combines this RPF with its own determinations, and forwards that combined RPF to the next node, and so on.

In yet another variation, the core network 110 and the access network 120 will each independently select an optimal path, preferably by selecting the path or path segment within the target matrix having the best or optimal RPF. In the event that the core network 110 and the access network 120 select the same path from their target matrices, or select path segments which may be joined to form a single, complete optimal path, the communication session may be routed accordingly.

In the event that the core network 110 and the access network 120 select different paths from the target matrix, or select path segments which may not be readily joined to form a single, complete (or overall) optimal path, other procedures, such as a negotiation or an arbitration procedure, may be utilized to select one of the two paths, or to determine other path segments that will produce a complete, overall optimal path, as the actual routing choice for establishment of the communication session or for handoff of the communication session.

As indicated above, in one of the exemplary embodiments of the present invention, each network element (core network or access network) may form a target matrix utilizing portions or segments of the system 100 which are within its control, with the potential paths being all (or many) of the combinations formed by paths connecting all (or many) of the ingress and egress points, within its domain, for communication sessions. For example, as illustrated in FIG. 1, core network 2 has ingress and egress points to core networks 1 and N (via core network I/C 130) and to access network 3, and access network 3 has ingress and egress points to core network 2 and to access networks 1, 2 and N (via access network I/C 140). The corresponding network element may then perform its RPF calculations for each path segment within its target matrix, and may also provide an ordering or ranking of viable paths (e.g., by degree of optimality or goodness). Depending upon the selected embodiment, the various nodes may exchange information dynamically, such as communicating this information to other network elements, and providing updates as conditions change, such as changes in loading conditions, particularly when routing decisions may involve several separate network elements having path optimization functionality. As path segments are selected having optimal RPFs, all of this information is then utilized to join or "stitch" together the selected path segments which, in combination, have an overall best or optimal combined RPF and provide an optimal complete path for routing. As discussed in greater detail below, control over such a final decision may reside in various network elements, depending upon what other elements may be involved, and control may or may not be transferred as a session is routed and rerouted.

With this segmented approach, any network node having a path optimization ("PO") function may be involved in calculations to determine an optimal path. For example, an originating node PO calculates all RPFs for all ingress and egress options, eliminates all permutations which are not viable, sets a "hop" count to 1, and forwards this route and RPF information (target or path matrix) to each adjacent node (having PO functions) which has viable ingress and egress options from the perspective of the originating node. As indicated above, a given node may determine an RPF and forward it to another node, which combines this RPF with its own determinations, and forwards that combined RPF to the next node, and so on. Each of these adjacent nodes calculate RPFs for all of its ingress and egress options, eliminates all permutations which are not viable, increments the "hop" count, and further forwards the individual or combined RPF information to each adjacent node (having PO functions) which has viable ingress and egress options from the perspective of the originating node, and which has not yet contributed to this process. This process is repeated until a terminal node is reached, or the hop count reaches a maximum threshold. The terminal node collects all of this information, namely, all of these segmented target matrices with either individual or combined RPF information, and transmits it to the originating node. The originating node may then search the various target matrices to select an optimal overall route, based upon these distributed but direct RPF calculations.

An arbitration, negotiation or other conflict resolution processes, to select an overall or complete optimal path, may be implemented in various ways, such as by providing various "veto powers" or decision preferences in the core network 110 and in the access network 120 for different types of routing choices. For example, arbitration may be implemented by providing for the core network 110 to select and/or control routing choices when core network interconnect 130 is utilized in one of the selected paths, and providing for the access network 120 to control routing choices when only access network interconnect 130 (or additional access network I/C 130) is utilized in one of the selected paths. The latter control allows for access networks 120 to optimize routing around the core network 110, to make local routing decisions autonomously, and to provide side-hauling of traffic directly between access networks 120. In addition, using the more segmented approach mentioned above, when a target matrix of an access network 120 involves only additional access network path segments, the APO functionality may also be implemented for access networks to have this independent control over such routing around the core network.

Negotiation or arbitration may also be implemented using negotiation strategies between the core network 110 and the access network 120, which potentially could result in selection of a third (previously unconsidered) path, as the better option for both the core network 110 and the access network 120, given the conflict of each of their first choices. Other negotiations may be involved to circumvent particular system bottlenecks or service problems, for example, involving path optimization functions for several network elements, particularly where circuitous routing may be involved. As another possible implementation of arbitration, one of the two path choices may be selected based upon any significant difference in the corresponding RPFs, such as selecting the access network's path choice when the corresponding RPF is significantly better than the core network's path choice, or selecting the core network's path choice when the corresponding RPF is significantly better than the access network's path choice. The arbitration procedure may be implemented non-distributively, residing in either the core network 110 or the access network 120, and not both, or as a negotiation, distributed among two or more network elements. Using the selected path from the arbitration or negotiation process, the communication session may then be routed accordingly.

Referring to FIG. 1, as illustrated, core network 1 (10A) and access network 1 (120A) will each, respectively, perform the CPO and APO functions, depending upon the selected embodiment, for the initial establishment of the communication session of communication path 1 (155), and/or for a subsequent handoff of the communication session, illustrated as communication path 2 (160). Communication path 2 (160) illustrates the communication session anchored in core network 1 (110A), but with access network 2 (120B) providing the radio or other access services to the mobile unit 175, as the mobile unit continues to move in the direction of access network N (120N). The path chosen by core network 1 (110A) and access network 1 (120A) for this handoff is through access network interconnect 140 shared by access network 1 (120A) and access network 2 (120B). Depending upon the selected embodiment, the APO functions may or may not be transferred or migrated from access network 1 (120A) to access network 2 (120B). As an alternative path configuration, depending upon the RPFs formed by the core network 1 (110A) and access network 1 (120A) in performing their path optimization functions and depending upon any arbitration of different results, rather than maintaining the link through access network 1 (120A), the path optimization functions may have forced the path to be directly from core network 1 (110A) to access network 2 (120B).

As mentioned above, depending upon the selected embodiment, CPO and APO functions may or may not be migrated or transferred to the then serving core network 110 or access network 120, respectively. Several methods are available for orchestrating the distributed path optimization functions of the present invention. One approach may be to have the anchor core network (e.g., core network 1 (110A) of FIG. 1) and originating access network (e.g., access network 1 (120A) of FIG. 1), via their respective CPO and APO functions, operate as the "master" decision makers based upon negotiation with, or simply information provided by, "slave" CPO and APO functions of the other core networks 110 and access networks 120. In other circumstances, either or both of the CPO and APO functions may migrate with the communication path, to be entirely or partially under the control or auspices of the currently serving core network 110 and/or access network 120. As indicated above, CPO and APO functions may be performed in segments throughout the system 100, with ultimate path selection performed, for example, in the originating network element (core network 110 or access network 120), and with the ultimate path selection migrating or not migrating with the communication path. In other embodiments, the APO functions may determine the selected path for some cases of mobility, such as where a communication session is migrated across a network using soft handoffs (e.g., through access network interconnect 140), while the CPO functions may determine the selected path when core networks 110 and core interconnect 130 are affected. In yet additional embodiments, the APO functions alone may determine migration of path optimization functions, without engaging the CPOs to effect the change.

Communication path 3 (165) illustrates a handoff that has migrated to access network 3 (120C), through access network interconnect 140 shared by access network 2 (120B) and access network 3 (120C), with links through both access network 1 (120A) and access network 2 (120B) maintained in the path. While less complex paths are clearly available via core network 2 (110B), for the purposes of example, it may be assumed that core network 2 (110B) is operated by a different service provider, and that a variable used by core network 1 (110A) in performing its CPO functions includes cost minimization by attempting to directly provide services and not route calls through other service providers. Or, as another example, it may be the case that insufficient bandwidth was available through core network 2 (110B) for the requirements of the particular communication session, necessitating routing through the access network I/C 140. Again, myriad alternative paths are clearly available, such as from core network 1 (110A) through core network 2 (110B) via core network interconnect 130, with the selection of a particular path based upon the routing variables and how they are combined to form the RPFs of the target matrices of the CPO and APO processes within the core network 1 (110A) and access network 120, the selected arbitration procedures, and depending upon the circumstances and events which may have transpired for the communication session as it has been migrated to this point. Depending upon the selected embodiment, it should also be noted that the APO functions, or the ultimate path selection portion of the APO functions (when path optimization is segmented), may or may not be transferred or migrated from access network 2 (120B) to access network 3 (120C), or from access network 1 (120A) to access network 3 (120C) (if not previously transferred to access network 2 (120B). As a consequence, communication path 3 illustrates that the optimal path, as selected using the present invention, may or may not be the most direct path with fewest links, and may or may not be the path with the lowest cost.

Communication path 4 (170) illustrates another handoff (or migration) which "hauls" the communication session back through the anchor core network 1 (110A) from access network N (120N) via core network N (110N) and core I/C 130, rather than utilizing the access network interconnect 140. Again, depending upon the selected embodiment, the APO functions, or the ultimate path selection portion of the APO functions (when path optimization is segmented), may or may not be transferred or migrated to access network N (120N), and the CPO functions may or may not be transferred or migrated to core network N (110N).

Figure 2:
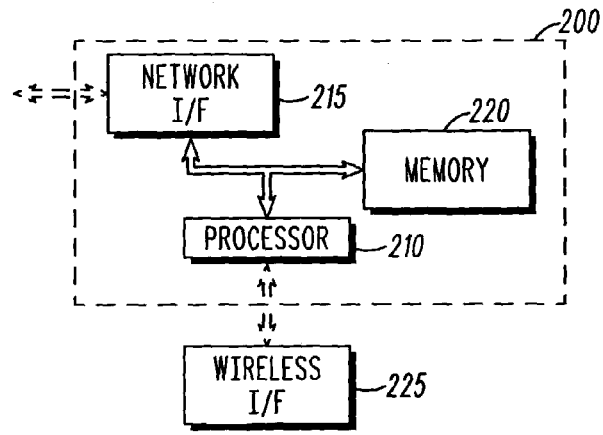
FIG. 2 is a block diagram illustrating an apparatus embodiment for segmented and distributed path optimization in accordance with the present invention.

FIG. 2 is a block diagram illustrating an apparatus embodiment for segmented and distributed path optimization in accordance with the present invention. Such an apparatus 200 may be included within any core network 110, such as an MSC, a router, a GGSN or SGSN, and/or within an access network (access network) 120, such as a BTS, a BSC, or a WLAN access point. (Numerous other variations and equivalent embodiments will be readily apparent and are also within the scope of the present invention).

Referring to FIG. 2, the apparatus 200 includes a processor 210, a network interface 215, and a memory 220. The network interface 215 is utilized for transmission and reception of communication sessions (packet or circuit switched), for routing of communication sessions, and for transmission and reception of various messages discussed below, such as the hand-off requests, routing choices, and routing determinations. In general, the network interface 215 provides a communication and/or signaling interface to and from any communication medium, of any kind, as may be known or become known in the art, such as wireless, wireline, coaxial cable, fiber optic, and so on, in accordance with any applicable protocols, such as IP or TCP/IP, or any applicable form of modulation or signaling, such as the signaling protocols of CDMA, GSM, signaling system 7 (SS7), IS 634 A1, IS 634 A7, Iu, or Iur. When the apparatus 200 is included within a BTS, it will also generally include a wireless interface 225, for wireless transmission and reception of a communication session and signaling with a mobile unit, such as a CDMA or GSM telephone or other handheld device, over any designated band of the electromagnetic spectrum.

The memory 220 may be any type of memory device, memory integrated circuit ("IC"), or memory portion of an integrated circuit (such as the resident memory within a processor IC), such as RAM, FLASH, DRAM, SRAM, MRAM, FeRAM, ROM, EPROM or E$^2$PROM, or any other type of memory or data storage apparatus or circuit, depending upon the selected embodiment, such as a magnetic hard drive or an optical storage device, or any other type of data storage apparatus. The memory 220 is used to store information pertaining to target matrices, routing preference factors, routing variables, arbitration results, current routing, other routing information, and program instructions, as discussed in greater detail below.

Continuing to refer to FIG. 2, the apparatus 200 further includes a processor 210, as the term processor is used herein, such that this implementation may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), adaptive computing ICs, associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SRAM, MRAM, ROM, EPROM or E$^2$PROM. The processor 210, with its associated memory, may be configured (via programming, FPGA interconnection, or hard-wiring) to perform the methodology of the invention, as discussed above and as further discussed below. For example, the methodology may be programmed and stored, in a processor with its associated memory (and/or memory 220) and other equivalent components, as a set of program instructions (or equivalent configuration or other program) for subsequent execution when the processor is operative (i.e., powered on and functioning). Equivalently, when the apparatus 200 is implemented in whole or part as FPGAs, custom ICs and/or ASICs, the FPGAs, custom ICs or ASICs also may be designed, configured and/or hard-wired to implement the methodology of the invention. For example, the apparatus 200 may implemented as an arrangement of microprocessors, DSPs and/or ASICs, collectively referred to as a "processor", which are respectively programmed, designed or configured to implement the methodology of the invention.

Figure 3A:
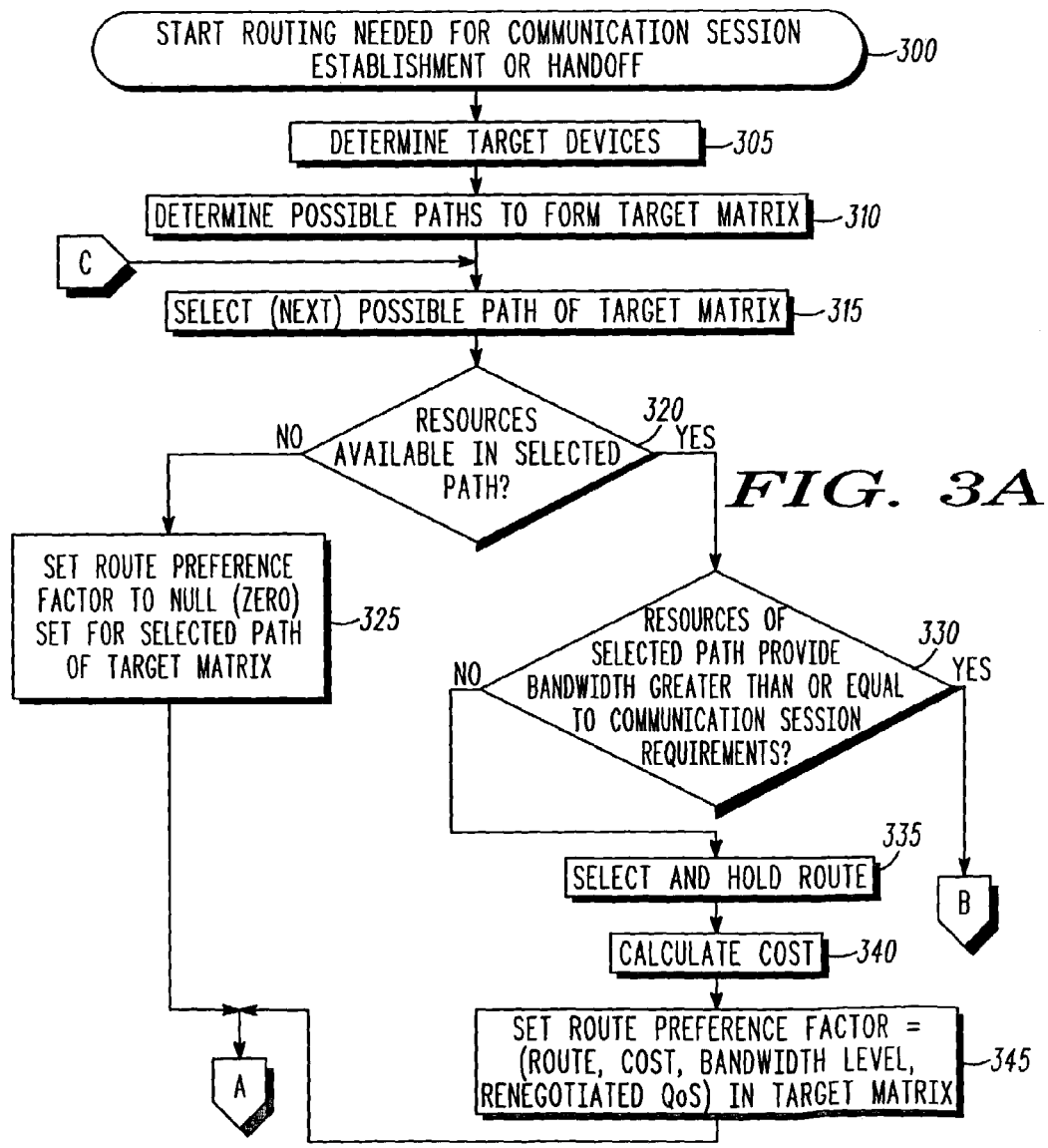

FIG. 3 is a flow diagram illustrating an exemplary method embodiment for segmented and distributed path optimization in accordance with the present invention. As indicated above, the present invention may be implemented in a variety of ways, such as, without limitation, using different types of routing variables, providing different weighting to the routing variables, transferring or not transferring APO and CPO functionality, providing for path optimization using path segments which are combined into an overall optimal path, providing for veto power in the core network 110 or in the access network 120 under various circumstances, and so on. As a consequence, the flow diagram of FIG. 3 should be considered merely an example of one of many potential method implementations of the present invention.

For the example of FIG. 3, five routing variables are utilized, for each potential path (or route): resource availability, bandwidth, quality of service, route complexity, and cost, and of these variables, resource availability outweighs all others. As a consequence, if a given potential path of the target matrix were not currently available, all other factors comprising the RPF are set to a null or zero value, without further evaluation, so that the given path is automatically not selected as optimal.

Referring to FIG. 3, the method begins, start step 300, when routing of some kind is needed, such as for call establishment, a handoff, or a packet data session. Portions of the method are then performed independently by both the core network 110 and the access network 120, beginning with step 305 and proceeding through step 400, as discussed below, for both the core network 110 and the access network 120 to determine all RPFs of their respective target matrices and to select their respective optimal paths. As indicated above, these steps may also be performed by many core networks 110 and access networks 120, with optimization and selection for path segments (ingress and egress points). In the path segmentation approach, as part of step 400, one network entity will also combine the selected, optimal segments to form a complete optimal path, if possible. Following step 400, the optimal path for routing is selected, either because both the core network 110 and the access network 120 have selected the same complete path, because a complete optimal path has been formed as connections or linkings of optimal path segments (as selected by a plurality of network elements), or because an arbitration or negotiation decision has been made. As indicated above, these steps (405, 410 and 415) would generally not be performed by both the core network 110 and the access network 120, but would be performed at a single point in the system 100, such as within the core network 110 alone, or the access network 120 alone, or an originating network element, and so on.

Following initiation of the method, potential targets (i.e., target access points) for the communication session are determined, step 305, such as target base transceiver stations or target wireless LAN access points of the access network 120, and potential paths to the targets are determined, step 310, to form a target matrix. The paths may be entire paths, for an end-to-end communication session, or may be path segments which, when combined, would form an end-to-end communication session. A given potential path of the target matrix is then selected in step 315, for determination of its RPF in subsequent steps. As indicated above, resource availability is then determined for the selected potential path, step 320. When or if the resources needed for the selected potential path are not available in step 320, the method proceeds to step 325, and effectively eliminates that selected potential path from consideration, by setting all other variables comprising the RPF to a null set (or zero). Following step 325, the method proceeds to step 395, to determine if additional iterations of the method are needed for other potential paths of the target matrix.

When or if the resources needed for the selected potential path are available in step 320, the method proceeds to step 330, and determines if the resources of the selected potential path provide sufficient bandwidth for the communication session requirements, such as whether the path will support a video conference (versus an audio conference) or a high speed data transfer. When or if sufficient bandwidth is not available in step 330, the method proceeds to steps 335, 340 and 345.

In step 335, the method selects and holds the potential path, as a possible route, and calculates associated costs of the route, step 340. The method then determines a corresponding RPF, step 345, based on route complexity, its cost, the unavailable bandwidth, and a corresponding quality of service (referred to as a renegotiated QoS, as this path is only actually available if the user (mobile unit) will allow a diminished bandwidth, such as eliminating the video portion of a video conference, and transmitting only the audio portion). Following step 345, the method also proceeds to step 395, for possible additional iterations.

When or if sufficient bandwidth is available in step 330, the method proceeds to step 350, and determines if the resources of the selected potential path provide sufficient quality of service for the end to end path for the communication session requirements, such as considering introduced delays or speed of operation from different legs (or hops) through network equipment, and potential technology interconversions. When or if sufficient quality of service is not available in step 350, the method proceeds to steps 355, 360, 365, 370 and 375.

In step 355, the method determines the service impact for the communication session, and in step 360, sets the QoS routing variable to that determined service impact. Next, in step 365, the method selects and holds the potential path, as a possible route, and in step 370, calculates associated costs of the route. The method then determines a corresponding RPF, step 375, based on route complexity, its cost, the available bandwidth, and a corresponding quality of service (set to the determined service impact). Following step 375, the method also proceeds to step 395, for possible additional iterations.

When or if sufficient quality of service is available in step 350, the method proceeds to steps 380, 385 and 390. In step 380, the method selects and holds the potential path, as a possible route, and in step 385, calculates associated costs of the route. The method then determines a corresponding RPF, step 390, based on route complexity, its cost, the available bandwidth, and the (sufficient) quality of service. Following step 390, the method also proceeds to step 3905, for possible additional iterations.

Following steps 325, 345, 375, or 390, the method proceeds to step 395, and determines whether there are additional potential paths, within the target matrix, which require a determination of a corresponding route preference factor. When there are additional paths, the method returns to step 315, and selects the next potential path for consideration, and iterates the methodology discussed above, for that next selected path. When there are no additional paths for RPF determination in step 395, the method proceeds to step 400, and selects the potential path of the target matrix having the best (or highest) RPF, as the optimal path or optimal path segment. In the segmented approach, one of the network entities will also perform an additional element of step 400, and link a plurality of selected, optimal path segments together to form a complete or overall optimal path, if possible. Again, as mentioned above, this selection of the optimal path is performed independently by both the core network 110 and the access network 120, as the first network portion and the second network portion, and performed independently by any other network elements involved in path optimization, with their perspectives having been accounted for by the various settings of the routing variables used in the RPF determinations of their respective target matrices, and also by the selected ingress and egress points, for path segmentation. As a result of the independent performance of these steps by both the core network 110 and the access network 120, a first possible optimal path and a second possible optimal path, respectively, have been determined, where these paths may be either complete, end-to-end paths, or may be path segments within the respective domains of the core network 110 and the access network 120. In this latter segmented approach, if possible, an overall, complete optimal path is formed as a combination of the first and second possible optimal paths (or more optimal path segments). At this stage of the method, the method is no longer generally performed by both the core network 110 and the access network 120, and may be performed at a single point within the system 100, such as by the core network 110, the access network 120, or the originating network entity of the system 100.

More generally, selection of the optimal path, or the forming of an optimal path by combining path segments, may be performed independently by any of the relevant network entities having path optimization functions (the core networks 110 and the access networks 120), rather than at a single point, provided that the method of selection utilized is consistent across the path optimization functions and that the information provided to each entity is generally the same (e.g., each receives the same target matrix information, RPFs, and so on, for the evaluation and selection of path segments for each relevant portion of the system 100).

Figure 4:
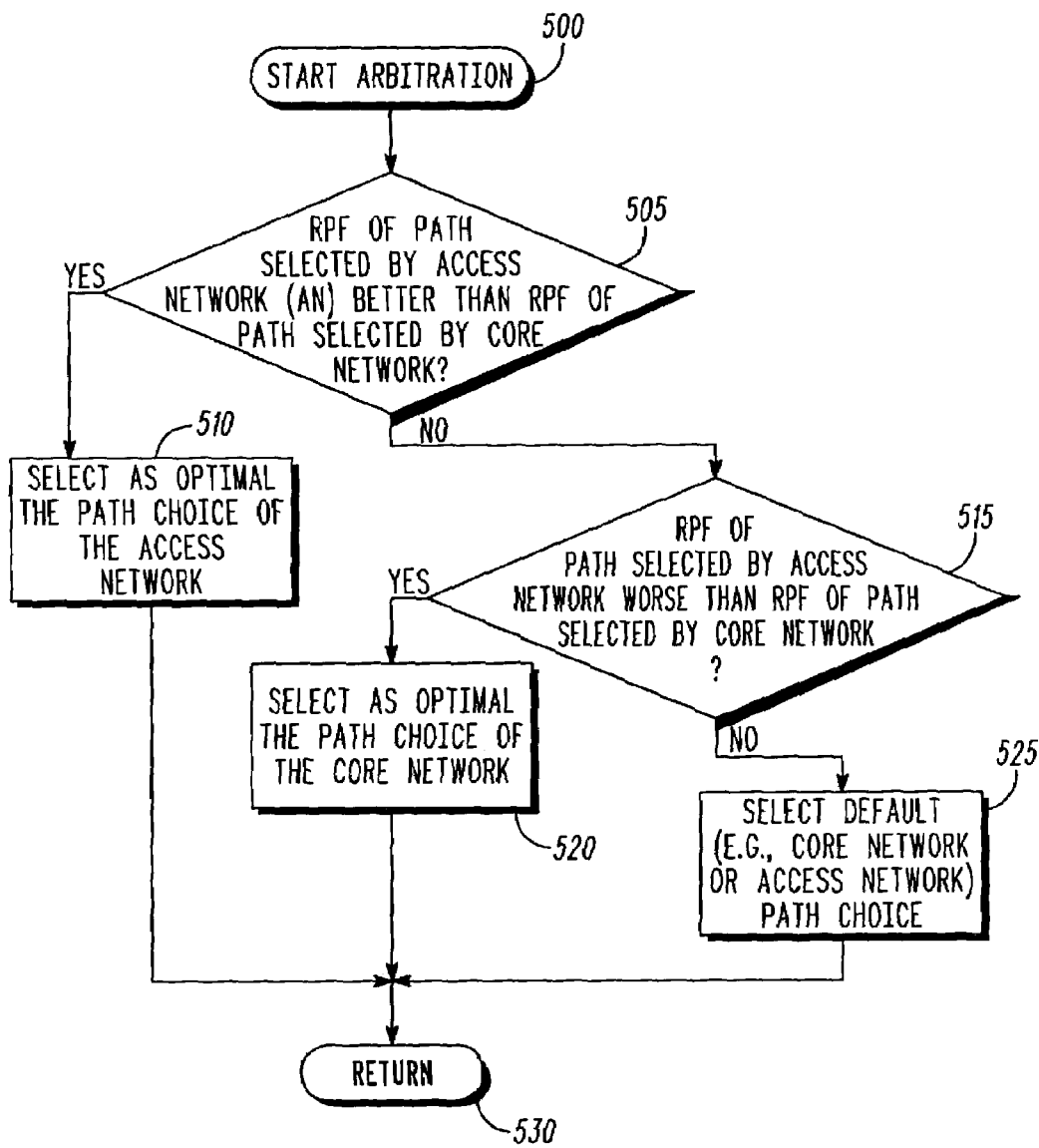
FIG. 4 is a flow diagram illustrating an exemplary arbitration portion of a method embodiment for segmented and distributed path optimization in accordance with the present invention.

Following the performance of step 400 (by both the core network 110 and the access network 120), the method proceeds to step 405, and determines either (1) whether the core network 110 and the access network 120 have both selected the same possible path as optimal, i.e., whether the first possible optimal path is the same path as the second possible optimal path, or (2), when the segmented approach is implemented, whether one overall optimal path has been formed from selected, optimal path segments. For example, as discussed above with respect to FIG. 1, for path 3 (165), there are any number of different ways in which a communication session could have been routed between core network 110A and access network 3 (120C), such as through the access network I/C 140 (illustrated as path 3) or through core network 2 (110B), and the corresponding CPO 180 and APO 190 functions may have selected the same path as optimal, such as path 3, or different paths as optimal, such as path 3 and a path via routing through core network 2 (110B). When both the core network 110 and the access network 120, as the first network portion and the second network portion, have not selected the same potential path as optimal, or when one overall, complete optimal path has not been formed from selected, optimal path segments, in step 405, the method proceeds to step 410, and performs a negotiation or arbitration procedure to determine an optimal path for actual routing. As indicated above, an arbitration may be based upon selecting one of the paths (either the first possible optimal path or the second possible optimal path, as illustrated in FIG. 4), or by selecting other path segments for combination into an overall, complete optimal path. In another, non-segmented embodiment, for example, an arbitration may be based upon a negotiation to select a third possible optimal path, given that only one of the two previously selected paths would have been routed, and a second, joint choice by both the core network 110 and the access network 120 may be better for actual routing, as previously discussed. In a segmented embodiment, other path segments may be considered, which may not have been the most optimal for a given domain but which, when combined with the other selected path segments, do provide an overall, complete optimal path. Following the arbitration to select an optimal path of step 410, or when both the core network 110 and the access network 120, as the first network portion and the second network portion, have selected the same potential path as optimal or have formed one overall optimal path from selected, optimal path segments in step 405, the method proceeds to step 415, and provides for the actual routing of this selected, complete optimal path. Following step 415, the method may end, return step 420.

FIG. 4 is a flow diagram illustrating an exemplary arbitration portion of a method embodiment for segmented and distributed path optimization in accordance with the present invention. As indicated above, there may be any number of different arbitration procedures; the process of FIG. 4, selecting the path having the best (or highest) RPF, should be considered merely a comparatively straightforward example of one of many potential implementations of arbitration, negotiation, or decision methods of the present invention. Other types of arbitration include, for example, allowing the access network 120 to make local decisions, optimizing around the core network 110; providing for the core network 110 and the access network 120 to each have control over the routing decision when the routing involves only additional interconnect within their control; and negotiation between the core network 110 and the access network 120 to select a third alternative path for routing, rather than the previously selected the first possible optimal path or the second possible optimal path.

Similarly, when a complete path is to be formed by combining path segments, with each path segment having been selected as having an optimal RPF, innumerable permutations and combinations of segments to form a singular path are possible. As a consequence, for this scenario, a decision, arbitration or negotiation process may be iterative, examining the target matrices of each path segment, and iteratively or successively selecting appropriate path segments having comparatively optimal or better RPFs, until an overall, complete path may-be formed.

Referring to FIG. 4, the arbitration method begins, step 500, when the core network 110 and the access network 120 have not selected the same potential path as optimal, or a complete optimal path has not been formed from optimal path segments. For example, the arbitration method may be called by step 410 (or its equivalent). Also at this time, in a typical program to implement the method of the invention, a variable such as "set route" will be cleared or set to null, until an optimal route is selected for actual routing by the arbitration procedure. Beginning with the most preferred paths or path segments of the target matrices, such as the first possible optimal path and the second possible optimal path, the method then compares their corresponding RPFs. In this embodiment, a higher RPF corresponds to a better RPF. In step 505, the method determines whether the RPF of the optimal path selected by the APO is higher (better) than the RPF of the optimal path selected by the CPO, and if so, proceeds to step 510, and selects the APO path choice as the optimal path for routing. When the RPF of the optimal path selected by the APO is not higher (better) than the RPF of the optimal path selected by the CPO, the method proceeds to step 515, and determines whether the RPF of the optimal path selected by the APO is lower (worse) than the RPF of the optimal path selected by the CPO. When the RPF of the optimal path selected by the APO is lower (worse) than the RPF of the optimal path selected by the CPO in step 515, the method proceeds to step 520, and selects the CPO path choice as the optimal path for routing. When the RPF of the optimal path selected by the APO is not lower (worse) than the RPF of the optimal path selected by the CPO in step 515, i.e., the RPFs are the same, the method proceeds to step 525, and selects a default path choice, such as the CPO path choice, or any other desired system bias. Following steps 510, 520 or 525, the arbitration procedure may end, setting a "set route" variable to the path choice for subsequent routing (e.g., returning to step 415), return step 530.

Not separately illustrated, another significant method of arbitration includes a negotiation between the core network 110 and the access network 120 to select a third alternative path for routing, rather than the previously selected the first possible optimal path or the second possible optimal path. For example, suppose the first possible optimal path has an RPF=a for the core network 110, but has an RPF=c for the access network 120, where a>>c, and the second possible optimal path has an RPF=a' for the access network 120, but has an RPF=c' for the core network 110, where 'a>>c'. Using a negotiation strategy (which may be implemented using a series of comparative steps), and selecting alternative paths from their respective target matrices, the core network 110 and the access network 120 may select a third, alternative possible path for routing having an RPF=b for the core network 110 and having an RPF=b' for the access network 120, where a>b>c and a'>b'>c', such that the selection of the third possible path is more optimal for both the core network 110 and the access network 120 compared to selecting either the first possible optimal path or the second possible optimal path (e.g., (b+b')>(a+c) and (b+b') >(a'+c'). This methodology may also be applied on the level of selection of path segments to form a complete optimal path. Numerous other methods of resolving potential conflicts in the selection of a possible path for routing, as indicated above, are also within the scope of the present invention.

In summary, the present invention provides distributed and segmented network path optimization, at both a core network level and an access network (access network) level, to provide the most efficient use of network resources, under both current and potentially changing circumstances and communication session requirements. Using factors or variables such as quality of service, requisite bandwidth, resource loading and availability, operator preferences, and route complexity, network path decisions are made by both the core network and the access network, with conflict resolution when necessary. The present invention allows the access network and core network to collaborate to select the most cost efficient and highest quality paths between and among their respective resources, and further allows the access network to make local optimization decisions autonomously and to independently optimize around the core network.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

The invention claimed is:

1. A method of path optimization for routing of a communication session in a network, the network including a plurality of core networks coupled to a plurality of access networks, the method comprising the steps of:

(a) determining, by a core network of the plurality of core networks, a plurality of possible paths to a plurality of target access points to form a first target matrix for the core network;

(b) determining, by an access network of the plurality of access networks, a plurality of possible paths to a plurality of target access points to form a second target matrix for the access network;

(c) determining, by the core network, a corresponding route preference factor for each possible path of the first target matrix;

(d) determining, by the access network, a corresponding route preference factor for each possible path of the second target matrix;

(e) by the core network, selecting from the first target matrix a first possible path of the plurality of possible paths having an optimal route preference factor;

(f) by the access network, selecting from the second target matrix a second possible path of the plurality of possible paths having an optimal route preference factor; and (g) by one of the core network and access network, determining a complete path, based on the first possible path and the second possible path, for routing of the communication session.

2. The method of claim 1, wherein each possible path of the plurality of possible paths is a path segment, and wherein the complete path is formed as a combination of the first possible path and the second possible path.

3. The method of claim 1, wherein for each possible path of the first target matrix, the core network determines the corresponding route preference factor based upon a plurality of routing variables; and wherein for each possible path of the second target matrix, the access network determines the-corresponding route preference factor based upon the plurality of routing variables.

4. The method of claim 3, wherein the plurality of routing variables includes at least two variables selected from a group of variables, the group of variables comprising: quality of service; bandwidth for the communication session; route complexity; interconnect cost; routing cost; resource loading; resource availability; security; data volume; user preference; and operator preference for traffic biasing.

5. The method of claim 4, wherein the quality of service variable is a function of bandwidth, introduced delays and technology interconversions.

6. The method of claim 4, wherein the interconnect cost variable is a function of a summation of path legs of the potential path and potential costs of system operators.

7. The method of claim 4, wherein the route complexity variable is a function of distance of the potential path, potential instability of a handoff of the communication session, a quantity of path legs of the potential path, a quantity of network elements involved in the potential path, and a quantity of domains crossed in the potential path.

8. The method of claim 3, wherein the plurality of routing variables are assigned numerical values corresponding to current network conditions.

9. The method of claim 8, wherein the route preference factor is determined as a weighted sum of the corresponding numerical values of the plurality of routing variables.

10. The method of claim 1, wherein each possible path of the plurality of possible paths is a complete path, and when the first possible path and the second possible path are the same path, the same path is selected as the complete path for routing of the communication session.

11. The method of claim 1, wherein each possible path of the plurality of possible paths is a complete path, and wherein step (g) further comprises:

when the first possible path and the second possible path are not the same path, determining the complete path for routing of the communication session by:

(g1) when the route preference factor for the second possible path is more optimal than the route preference factor for the first possible path, selecting the second possible path as the complete path for routing of the communication session;

(g2) when the route preference factor for the second possible path is less optimal than the mute preference factor for the first possible path, selecting the first possible path as the complete path for muting of the communication session; and (g3) when the route preference factor for the second possible path is equally optimal with the mute preference factor for the first possible path, performing a default selection to determine the complete path for routing of the communication session.

12. The method of claim 11, wherein the default selection is the first possible path selected as optimal by the core network.

13. The method of claim 11, wherein the default selection is the second possible path selected as optimal by the access network.

14. The method of claim 1, wherein step (g) further comprises:

negotiating a third possible path as the complete path for muting of the communication session.

15. The method of claim 1, wherein step (g) further comprises:

when the second possible path does not involve additional core network interconnect, selecting the second possible path as the complete path for routing of the communication session.

16. The method of claim 1, wherein the path optimization is for routing of a handoff of the communication session from a first access point to a second access point of the plurality of target access points.

* * * * *